Patented Aug. 18, 1925.

1,550,192

UNITED STATES PATENT OFFICE.

KARL MARTELL WILD, OF STUTTGART, AND FRIEDRICH EHRMANN, OF FEUERBACH, GERMANY ASSIGNORS TO BOSCH-METALLWERK AKTIENGESELLSCHAFT, OF FEUERBACH, GERMANY.

PROCESS OF RECOVERING ALUMINUM.

No Drawing.   Application filed February 14, 1924.   Serial No. 692,878.

*To all whom it may concern:*

Be it known that we, KARL MARTELL WILD and FRIEDRICH EHRMANN, citizens of Germany, residing at Stuttgart and Feuerbach, Germany, respectively, have invented certain new and useful Improvements in a Process of Recovering Aluminum; and we do hereby declare the following to be a full, clear, and exact description of the invention, such as will enable others skilled in the art to which it appertains to make and use the same.

This invention relates to a method of recovering aluminum and the like from waste and residues, chips, sweepings, and the like. It is known for the purpose of recovering aluminum and other light metals, as well as alloys thereof, from sheet-metal waste, chips, sweepings, and the like, to add chloride of zinc or of ammonium to the metal-bath, whereby the oxide-skin enveloping the small metal-particles is dissolved or caused to burst, the amount of the output being correspondingly increased. The results of this known procedure are not wholly satisfactory. Another known process consists in providing the bath with a protective layer or covering which, besides, may have the effect of dissolving the oxide-envelops of the small metal-particles and, thus, to promote the coalescence or flowing together thereof.

Our invention now consists in a process in which, apart from certain conditions to be observed and later on mentioned, the two methods which are singly known are combined with each other in a particular manner, from which results are obtained which are not to be reached by using the known means or processes separately.

According to our method the scrapings and other waste particles are introduced gradually into a metal bath of molten coarse pieces of the respective metal; then a fluxing chloride, such as chloride of zinc or of ammonium, is introduced into the mixture of the waste metal pieces and the metal bath, whereafter common salt (sodium chloride) or another substance apt to serve as covering means for the mixture is thrown on the mass; finally, the entire bath is thoroughly stirred below the protective layer formed by the salt used.

Concerning the several phases forming, in their entirety, our improved method, we state the following details:

The first bath which is prepared in a crucible must be somewhat thin, and should not, therefore, be made of chips or such waste particles which have a large surface and, consequently, a large oxide-skin in proportion to their bulk, as such a bath would be pretty thick and the small metal balls would separate only with difficulty. In view of this, the first bath should be made either with the usual raw-material in the form of pigs or blocks, or coarse scrap broken waste, old cast-metal parts, and the like, should be used, at any rate such pieces as have a small surface in proportion to their bulk, and cannot, therefore, render the bath impure by their oxide-skin. Scraps and other small waste-pieces which are introduced into a properly prepared bath, as before described, get rid comparatively easily of the aluminum or other metal to be recovered, as firstly, they are surrounded on all sides by liquid metal and are, consequently, very well heated, and secondly the small metal balls can unite with the molten metal already after only one oxide-skin has been penetrated.

The slag collecting on the surface of the metal-bath after the chips etc. have been introduced therein, and mixed therewith, is at first very tough and, therefore, tends to cake, especially as the bath has been but little soiled by oxides, and is, consequently, pretty thin. The chloride of zinc or of ammonium then thrown onto the slag in pulverulent state is thoroughly mixed with the metal-bath whereby the caking property is considerably reduced, but there arises on the other side the risk that the metal separating from the slag burns because the temperature of the bath rises considerably owing to the addition of the chloride, without any exterior application of heat. In order to obviate the combustion of the separated metal, the addition of the chloride must be accelerated as much as possible, and the glowing slag must be covered with a layer of a suitable salt by which it is prevented from coming into contact with the air. The respective salt may be in dry state or in molten state, addition of the covering salt in molten condition being more especially to be recommended because of the higher recovery of aluminum thereby attained. Then the bath is thoroughly stirred below the layer of salt, and while this is being done the slag loses gradually its toughness, crumbles away, and the small metal particles therein contained are liberated and get over into the bath.

We claim:

1. The process of recovering aluminum and other light metals or alloys thereof from sheet-metal waste, chips, sweepings, and other residues, consisting in preparing a bath from a metal like that to be produced with the aid of coarse pieces of the respective metal, introducing gradually the respective residues etc. into said bath, adding a fluxing chloride to the mixture formed by the metal-bath and the waste or residues etc., covering the whole with a layer of a substance adapted to prevent contact of the recovered metal with the air, and stirring thoroughly the thus prepared bath below said layer, substantially as described.

2. The process of recovering aluminum and other light metals or alloys thereof from sheet-metal waste, chips, sweepings, and other residues, consisting in preparing a bath from a metal like that to be produced with the aid of coarse pieces of the respective metal, introducing gradually the respective residues etc. into said bath, adding chloride of zinc to the mixture formed by the metal-bath and the waste or residues etc., covering the whole with a layer of a salt adapted to prevent contact of the recovered metal with the air, and stirring thoroughly the thus prepared bath below said layer, substantially as described.

3. The process of recovering aluminum and other light metals or alloys thereof from sheet-metal waste, chips, sweepings and other residues, consisting in preparing a bath from a metal like that to be produced with the aid of coarse pieces of the respective metal, introducing gradually the respective residues etc. into said bath, adding chloride of ammonium to the mixture formed by the metal bath and the waste or residues etc., covering the whole with a layer of sodium chloride, and stirring thoroughly the thus prepared bath below the layer formed by said chloride, substantially as described.

4. The process of recovering aluminum and other light metals or alloys thereof from sheet-metal waste, chips, sweepings, and other residues, consisting in preparing a bath from a metal like that to be produced with the aid of coarse pieces of the respective metal, introducing gradually the respective residues etc. into said bath, adding a chloride to the mixture formed by the metal-bath and the waste or residues etc., adding to the whole a suitable salt in molten condition to form a covering layer adapted to prevent contact of the recovered metal with the air and stirring thoroughly the thus prepared bath below said layer, substantially as described.

5. The process of recovering aluminum and other light metals or alloys thereof from sheet-metal waste, chips, sweepings, and other residues, consisting in preparing a bath from a metal like that to be produced with the aid of coarse pieces of the respective metal, introducing gradually the respective residues etc. into said bath, adding chloride of zinc to the mixture formed by the metal-bath and the waste or residues etc., adding molten sodium chloride to the bath to provide a covering layer therefor, and stirring thoroughly the thus prepared bath below said layer, substantially as described.

In testimony whereof we have hereunto affixed our signatures.

KARL MARTELL WILD.
FRIEDRICH EHRMANN.